United States Patent
Park et al.

(10) Patent No.: US 9,236,609 B2
(45) Date of Patent: Jan. 12, 2016

(54) POSITIVE ACTIVE MATERIAL FOR RECHARGEABLE LITHIUM BATTERY, METHOD OF PREPARING SAME, AND RECHARGEABLE LITHIUM BATTERY INCLUDING SAME

(71) Applicant: SAMSUNG SDI CO., LTD., Yongin-si, Gyeonggi-do (KR)

(72) Inventors: Han-Eol Park, Yongin-si (KR); Byung-Joo Chung, Yongin-si (KR); Chang-Wook Kim, Yongin-si (KR); Chun-Gyoo Lee, Yongin-si (KR); Jong-Seo Choi, Yongin-si (KR); Yoon-Chang Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 182 days.

(21) Appl. No.: 13/963,949

(22) Filed: Aug. 9, 2013

(65) Prior Publication Data
US 2014/0065483 A1    Mar. 6, 2014

(30) Foreign Application Priority Data

Sep. 4, 2012    (KR) .......................... 10-2012-0097887

(51) Int. Cl.
*H01M 4/525*    (2010.01)
*H01M 4/505*    (2010.01)
*C01G 53/00*    (2006.01)
*H01M 4/36*    (2006.01)

(52) U.S. Cl.
CPC ............ *H01M 4/525* (2013.01); *C01G 53/006* (2013.01); *C01G 53/50* (2013.01); *H01M 4/366* (2013.01); *H01M 4/505* (2013.01); *C01P 2002/72* (2013.01); *C01P 2002/85* (2013.01); *C01P 2004/03* (2013.01); *C01P 2006/40* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 7,695,649 B2 | 4/2010 | Paulsen et al. | |
| 2003/0108794 A1* | 6/2003 | Park et al. | ................ 429/231.1 |
| 2005/0069758 A1 | 3/2005 | Kitao et al. | |
| 2007/0224506 A1* | 9/2007 | Ooyama et al. | ............ 429/231.3 |
| 2009/0068561 A1 | 3/2009 | Sun et al. | |
| 2012/0070725 A1* | 3/2012 | Venkatachalam et al. | .... 429/188 |

FOREIGN PATENT DOCUMENTS

| | | |
|---|---|---|
| JP | 2009-525578 A | 7/2009 |
| KR | 10-0404891 B1 | 11/2003 |
| KR | 10-2005-0031422 A | 4/2005 |
| KR | 10-0809847 B1 | 3/2008 |

* cited by examiner

*Primary Examiner* — Patrick Ryan
*Assistant Examiner* — Wyatt McConnell
(74) *Attorney, Agent, or Firm* — Christie, Parker & Hale, LLP

(57) ABSTRACT

A positive active material for a rechargeable lithium battery includes a nickel-based composite oxide represented by the following Chemical Formula 1, wherein the nickel-based composite oxide includes an over lithiated oxide and non-continuous portions of a lithium nickel cobalt manganese oxide on a surface of the over lithiated oxide.

$$Li_aNi_bCo_cMn_dO_2 \quad \text{Chemical Formula 1}$$

where $1<a<1.6$, $0.1<b<0.7$, $0.1<c<0.4$, and $0.1<d<0.7$.

10 Claims, 9 Drawing Sheets

POSITIVE ACTIVE MATERIAL FOR RECHARGEABLE LITHIUM BATTERY, METHOD OF PREPARING SAME, AND RECHARGEABLE LITHIUM BATTERY INCLUDING SAME

CROSS-REFERENCE TO RELATED APPLICATION

This application claims priority to and the benefit of Korean Patent Application No. 10-2012-0097887, filed in the Korean Intellectual Property Office on Sep. 4, 2012, the entire contents of which are incorporated herein by reference.

BACKGROUND

1. Field

This disclosure relates to positive active material for a rechargeable lithium battery, a method of preparing the same, and a rechargeable lithium battery including the same.

2. Description of the Related Art

Rechargeable lithium batteries have recently drawn attention as a power source for small portable electronic devices. They use an organic electrolyte solution and thereby, have a discharge voltage that is at least two times higher than that of conventional batteries using an alkali aqueous solution, and as a result, they have relatively high energy density.

A rechargeable lithium battery is manufactured by injecting an electrolyte into an electrode assembly. The electrode assembly includes a positive electrode including a positive active material capable of intercalating/deintercalating lithium ions and a negative electrode including a negative active material capable of intercalating/deintercalating lithium ions.

As for the positive active material, $LiCoO_2$ has been widely used, however, it has a high manufacturing cost and an unstable supply due to the scarcity of cobalt (Co). Accordingly, a positive active material including Ni (nickel) and/or Mn (manganese) has been developed.

The positive active material using Ni (nickel) may be appropriately used for a high-capacity and high voltage battery but has an unstable structure and thus, deteriorates capacity and in addition, reacts with an electrolyte and thus, it has low thermal stability.

On the other hand over lithiated oxides (which may include Mn oxides) release lithium ions at a voltage of greater than or equal to about 4.55 V and thus, they have an increased capacity. However, the over lithiated oxides generate oxygen gas during the reaction and also, have a reduced initial efficiency because the lithium ions released from an irreversible reaction do not reparticipate in the reaction.

SUMMARY

Aspects of embodiments of the present invention are directed to a positive active material for a rechargeable lithium battery having high electrical conductivity that suppresses the generation of oxygen gas during charge and discharge, and also suppresses a reaction with an electrolyte and thus, a rechargeable lithium battery including the positive active material has high thermal stability.

Another embodiment of the present invention is directed to a method of preparing the positive active material for a rechargeable lithium battery.

Yet another embodiment of the present invention is directed to a rechargeable lithium battery including the positive active material.

According to one embodiment of the present invention, a positive active material for a rechargeable lithium battery includes a nickel-based composite oxide represented by the following Chemical Formula 1, wherein the nickel-based composite oxide includes over lithiated oxide and non-continuous (uncontinuous) portions of lithium nickel cobalt manganese oxide on a surface of the over lithiated oxide, an atomic weight ratio of Ni:Mn of the over lithiated oxide is in a range of about 1:1 to about 2:1, and an atomic weight ratio of Ni:Mn of the lithium nickel cobalt manganese oxide is in a range of about 3:1 to about 4:1:

  Chemical Formula 1 wherein, 1<a<1.6, 0.1<b<0.7, 0.1<c<0.4, and 0.1<d<0.7.

The over lithiated oxide may include a compound represented by the following Chemical Formula 2:

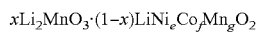  Chemical Formula 2 wherein, 0<x<1, 0<e<1, 0<f<1, 0<g<1, and e+f+g=1.

The over lithiated oxide may be included in an amount of about 5 wt % to about 60 wt % based on the total weight of the nickel-based composite oxide. Or, the over lithiated oxide may be included in an amount of about 15 wt % to about 50 wt % based on the total weight of the nickel-based composite oxide.

The lithium nickel cobalt manganese oxide may include a compound represented by the following Chemical Formula 3:

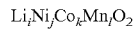  Chemical Formula 3 wherein, 0.95<i<1.05, 0.4≤j≤0.8, 0.1≤k≤0.3, and 0.1≤l≤0.3.

The lithium nickel cobalt manganese oxide may be included in an amount of about 40 wt % to about 95 wt % based on the total weight of the nickel-based composite oxide. Or, the lithium nickel cobalt manganese oxide may be included in an amount of about 50 wt % to about 85 wt % based on the total weight of the nickel-based composite oxide.

The atomic weight ratio of Ni:Mn of the over lithiated oxide may be in a range of about 1:1 to about 1.7:1, and an atomic weight ratio of Ni:Mn of the lithium nickel cobalt manganese oxide may be in a range of about 3:1 to about 3.5:1.

According to another embodiment of the present invention, a method of preparing a positive active material for a rechargeable lithium battery includes co-precipitating a first nickel (Ni) raw material, a first cobalt (Co) raw material, a first manganese (Mn) raw material, ammonium hydroxide ($NH_4OH$), and sodium hydroxide (NaOH) to obtain a first precipitate. The first precipitate is mixed with a lithium raw material to obtain a first mixture. The first mixture is heat-treated. Then, the heat treated first mixture, a second nickel (Ni) raw material, a second cobalt (Co) raw material, and a second manganese (Mn) raw material, ammonium hydroxide ($NH_4OH$), and sodium hydroxide (NaOH) are co-precipitated to form a second precipitate on a surface of the heat treated first mixture. The resulting material, i.e., the second precipitate on a surface of the heat treated first mixture and the lithium raw material are mixed to obtain a second mixture. The second mixture is then heat-treated to obtain the nickel-based composite oxide represented by the above Chemical Formula 1.

The heat treating the first mixture and the heat treating the second mixture may each independently be performed at about 890° C. to about 1000° C.

According to yet another embodiment of the present invention, a rechargeable lithium battery includes a positive electrode including the positive active material; a negative electrode; and an electrolyte.

Hereinafter, further embodiments of this disclosure will be described in detail.

According to aspects of embodiments of the present invention, the positive active material has high electrical conductivity and suppresses generation of oxygen gas and a reaction of the active material with an electrolyte and thus, realizes high thermal stability and accordingly, may realize a rechargeable lithium battery having improved performance.

DETAILED DESCRIPTION

Exemplary embodiments of the present disclosure will hereinafter be described in detail. However, these embodiments are only exemplary, and this disclosure is not limited thereto.

The positive active material according to one embodiment includes nickel-based composite oxide represented by the following Chemical Formula 1:

   Chemical Formula 1 wherein, $1<a<1.6$, $0.1<b<0.7$, $0.1<c<0.4$, and $0.1<d<0.7$.

The nickel-based composite oxide represented by the above Chemical Formula 1 may include an over lithiated oxide and a lithium nickel cobalt manganese oxide coated on a surface of the over lithiated oxide.

The over lithiated oxide may be a compound represented by the following Chemical Formula 2:

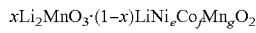   Chemical Formula 2 wherein, $0<x<1$, $0<e<1$, $0<f<1$, $0<g<1$, and $e+f+g=1$.

The positive active material that includes the over lithiated oxide may realize a rechargeable lithium battery having high-capacity at a high voltage of about 4.55 V.

The over lithiated oxide may be included in an amount of about 5 wt % to about 60 wt % based on the total weight of the nickel-based composite oxide. In some embodiments, the over lithiated oxide may be included in an amount of about 15 wt % to about 50 wt % based on the total weight of the nickel-based composite oxide. In some embodiments, when the over lithiated oxide is included within the range, capacity per unit mass is significantly increased.

The lithium nickel cobalt manganese oxide may include a compound represented by the following Chemical Formula 3.

   Chemical Formula 3 wherein, $0.95<i<1.05$, $0.4≤j≤0.8$, $0.1≤k≤0.3$, and $0.1≤l≤0.3$.

The positive active material includes lithium nickel cobalt manganese oxide coated on the surface of the over lithiated oxide and thus, the generation of oxygen gas during charge and discharge and reaction of the active material with an electrolyte is suppressed, thereby realizing a rechargeable lithium battery having high thermal stability.

The lithium nickel cobalt manganese oxide may be included in an amount of about 40 wt % to about 95 wt % based on the total weight of the nickel-based composite oxide. In some embodiments, the lithium nickel cobalt manganese oxide may be included in an amount of about 50 wt % to about 85 wt % based on the total weight of the nickel-based composite oxide. In some embodiments, when the lithium nickel cobalt manganese oxide is included within the above described range, generation of oxygen gas during charge and discharge of the negative active material is suppressed, and thus, a rechargeable lithium battery having high-capacity and high thermal stability is realized.

Figure 1:
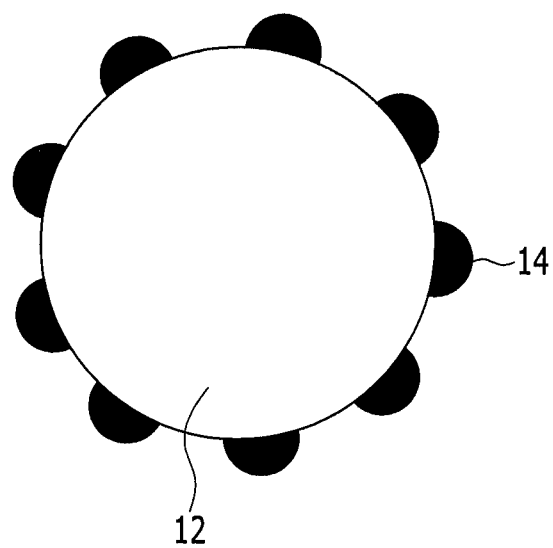
FIG. 1 is a schematic view depicting a structure of a positive active material according to one embodiment.

The structure of the nickel-based composite oxide may be understood referring to FIG. 1.

FIG. 1 is a schematic view depicting a structure of a positive active material according to one embodiment.

Referring to FIG. 1, the positive active material 10 may have a structure whereby over lithiated oxide 12 is coated with the lithium nickel cobalt manganese oxide 14 on the surface. The coating may be performed in an island shape as shown in FIG. 1, i.e., non-continuous portions of lithium nickel cobalt manganese oxide may be on a surface of the over lithiated oxide 12.

When the positive active material includes lithium nickel cobalt manganese oxide coated on the over lithiated oxide, the positive active material may be suppressed from reacting with an electrolyte. In addition, when the positive active material includes lithium nickel cobalt manganese oxide having high electrical conductivity on the surface, high-capacity at high current density may be obtained.

Because the nickel-based composite oxide has a structure including an over lithiated oxide coated with a lithium nickel cobalt manganese oxide on the surface, manganese and nickel components in the nickel-based composite oxide may have a structural concentration gradient. Specifically, the nickel-based composite oxide includes a higher concentration of nickel on the surface than at the interior.

More specifically, Ni:Mn inside or at an interior of the nickel-based composite oxide (i.e., the Ni:Mn of the over lithiated oxide) may have an atomic weight ratio of about 1:1 to about 2:1. In some embodiments, the Ni:Mn atomic weight ratio inside the nickel-based composite oxide may be about 1:1 to about 1.7:1. The atomic weight ratio of Ni:Mn on the surface or at an outside of the nickel-based composite oxide (i.e., the Ni:Mn atomic weight ratio of the lithium nickel cobalt manganese oxide) may be about 3:1 to about 4:1. In some embodiments, the Ni:Mn atomic weight ratio on the surface of the nickel-based composite oxide may be about 3:1 to 3.5:1. In some embodiments, when nickel and manganese are respectively included within the atomic weight ratio ranges both inside (i.e., at an interior of) and on the surface (i.e., at an outside) of the nickel-based composite oxide, the positive active material is suppressed from reacting with an electrolyte and in addition, high-capacity at high current density due to the lithium nickel cobalt manganese oxide having high conductivity on the surface may be realized. In other words, in some embodiments, when the Ni:Mn atomic weight ratio of the over lithiated oxide and the Ni:Mn atomic weight ratio of the lithium nickel cobalt manganese oxide are within the above ranges, the above benefits may be realized.

The positive active material may be prepared by the following method. In some embodiments, the method includes co-precipitating each metal raw material including nickel (Ni), cobalt (Co), and manganese (Mn), ammonium hydroxide ($NH_4OH$), and sodium hydroxide (NaOH) to obtain a first precipitate. The first precipitate is then mixed with a lithium raw material to obtain a first mixture. Then, the method includes heat-treating the first mixture, co-precipitating the heat treated first mixture with each metal raw material including nickel (Ni), cobalt (Co), and manganese (Mn), the ammonium hydroxide ($NH_4OH$), and the sodium hydroxide (NaOH) to form a second precipitate on a surface of the heat treated first mixture. Then, the resulting material, i.e., the heat-treated first mixture having the second precipitate on a surface thereof (the second precipitate on a surface of the heat treated first mixture) and the lithium raw material are mixed to obtain a second mixture, and the second mixture is heat-treated to obtain the nickel-based composite oxide represented by the above Chemical Formula 1.

The heat-treated first mixture may be the aforementioned over lithiated oxide.

Herein, each of the co-precipitation reactions may be performed at a pH of about 10 to about 12, a temperature of about 35° C. to about 40° C., and at a reaction speed of about 600 rpm to about 800 rpm for about 8 hours to about 10 hours.

The lithium raw material may include lithium carbonate, lithium acetate, lithium hydroxide, and/or the like. The metal raw material may include a metal-containing acetate, a metal-containing nitrate, a metal-containing hydroxide, a metal-containing oxide, a metal-containing sulfate, and/or the like. However, the lithium raw material and the metal raw material are not limited thereto. In some embodiments, the metal raw material is a metal-containing sulfate. The co-precipitation may be performed in a solvent. The solvent may be water, ethanol, methanol, acetone, and/or the like.

Each of the heat treatments may be performed at about 890° C. to about 1000° C. In some embodiments, each of the heat treatments may be performed at about 900° C. to about 950° C. The first and second heat treatments may be performed at the same or different temperatures. In some embodiments, the heat-treatments may be performed while the temperature is increased, for example, the heat-treatments may be performed by increasing the temperature to 1° C./min to 5° C./min until the temperature reaches to about 890° C. to about 1000° C. In some embodiments, when the heat treatment is performed within the above temperature range, the positive active material has primary and secondary particle sizes that provide optimum (e.g., maximum) capacity and in addition, crystallinity of the over lithiated oxide is maintained.

Hereinafter, a rechargeable lithium battery including the positive active material is illustrated referring to FIG. 2.

Figure 2:
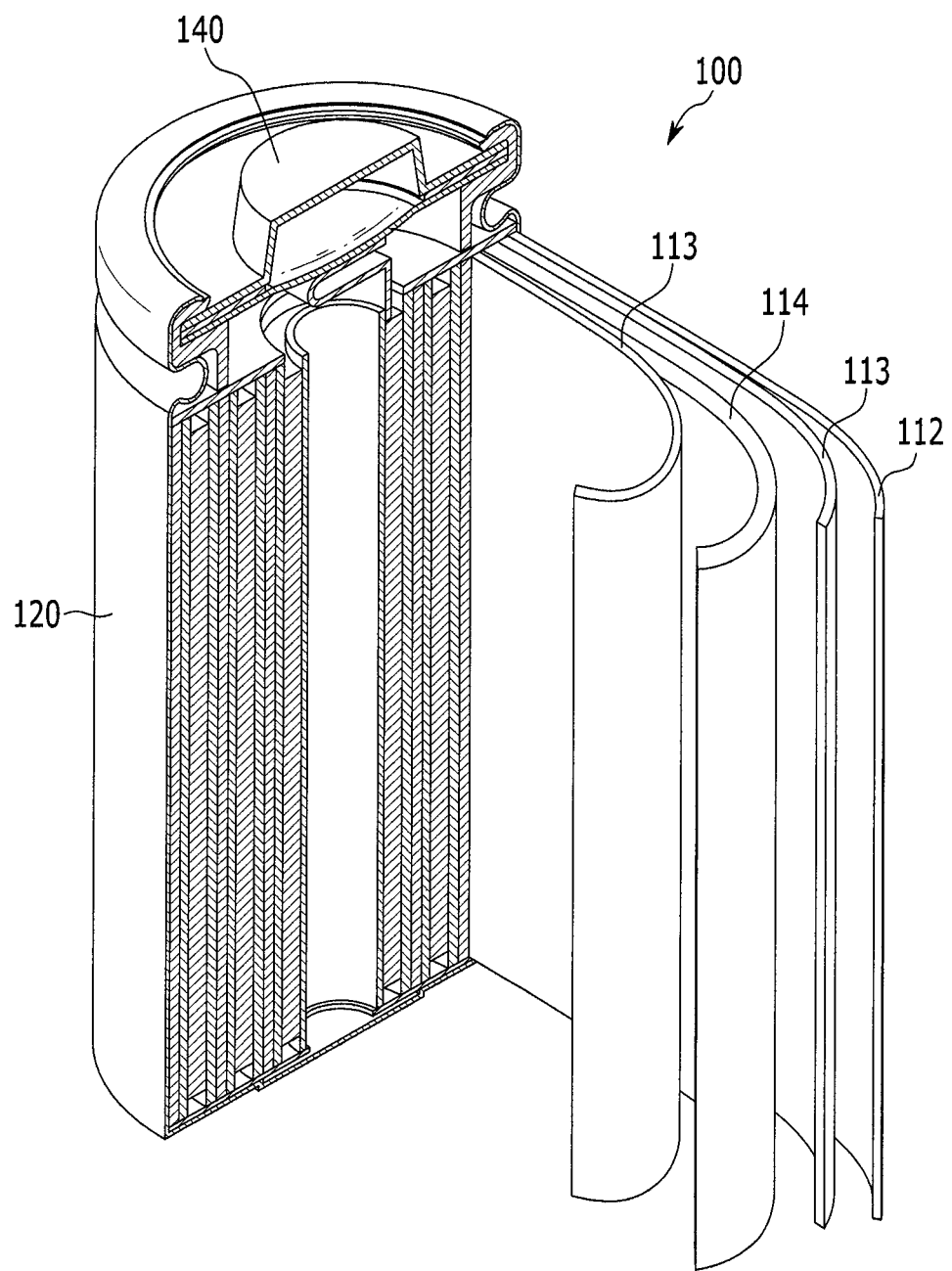
FIG. 2 is a schematic view depicting a structure of a lithium rechargeable battery according to one embodiment.

FIG. 2 is a schematic view depicting a structure of a lithium rechargeable battery according to one embodiment.

Referring to FIG. 2, a rechargeable lithium battery 100 according to one embodiment includes a positive electrode 114, a negative electrode 112 facing the positive electrode 114, a separator 113 interposed between the negative electrode 112 and the positive electrode 114, an electrolyte (not shown) impregnating the separator 113, a battery case 120, and a sealing member 140 sealing the battery case 120.

The positive electrode 114 includes a current collector and a positive active material layer disposed on the current collector. The positive active material layer includes a positive active material, a binder, and optionally a conductive material.

The current collector may be Al, but it is not limited thereto.

The positive active material may be the nickel-based composite oxide described above. When the nickel-based composite oxide is used as a positive active material, the positive active material has high electrical conductivity and the generation of oxygen gas and a reaction with an electrolyte is suppressed, and thus, realizes high thermal stability and accordingly, a rechargeable lithium battery including the nickel-based composite oxide may have improved performance.

The binder improves binding properties of the positive active material particles to each other and to a current collector. Examples of the binder include at least one selected from polyvinyl alcohol, carboxylmethyl cellulose, hydroxypropyl cellulose, diacetyl cellulose, polyvinylchloride, carboxylated polyvinyl chloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, however, the binder is not limited thereto.

The conductive material is used in order to improve conductivity of an electrode. Any electrically conductive material may be used as a conductive material unless it causes a chemical change. Examples of the conductive material include a carbon-based material such as natural graphite, artificial graphite, carbon black, acetylene black, ketjen black, a carbon fiber, and/or the like; a metal-based material of metal powder or metal fiber including copper, nickel, aluminum, silver, and/or the like; a conductive polymer such as a polyphenylene derivative; and mixtures thereof.

The negative electrode 112 includes a negative collector and a negative active material layer disposed on the negative current collector.

The negative current collector may be a copper foil.

The negative active material layer may include a negative active material, a binder, and optionally a conductive material.

The negative active material may include a material that reversibly intercalates/deintercalates lithium ions, lithium metal, a lithium metal alloy, a material being capable of doping/dedoping lithium, or a transition metal oxide.

The material that reversibly intercalates/deintercalates lithium ions may be a carbon material. The carbon material may be any carbon-based negative active material that is generally used in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and/or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and/or Sn.

Examples of the material being capable of doping/dedoping lithium include a Si-based compound such as Si, $SiO_x$ (0<x<2), a Si—C composite, a Si-Q alloy (wherein Q is not Si and is an alkali metal, an alkaline-earth metal, a Group 13 to 16 element, a transition element, a rare earth element, or a combination thereof), a Si—C composite, or a combination thereof; a Sn-based compound such as Sn, $SnO_2$, a Sn—C composite, a Sn—R alloy (wherein R is not Sn and is an alkali metal, an alkaline-earth metal, a Group 13 to 16 element, a transition element, a rare earth element, or a combination thereof), or a combination thereof; or a combination thereof. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide include vanadium oxide, lithium vanadium oxide, and the like.

The binder improves binding properties of negative active material particles with one another and with a current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but the binder is not limited thereto.

The conductive material is included to improve electrode conductivity. Any electrically conductive material may be used as a conductive material unless it causes a chemical change. Examples of the conductive material include a carbon-based material such as natural graphite, artificial graphite, carbon black, acetylene black, ketjen black, a carbon fiber, and/or the like; a metal-based material of metal powder or metal fiber including copper, nickel, aluminum, silver, and/or the like; a conductive polymer such as a polyphenylene derivative; or a mixture thereof.

Each of the negative and positive electrodes 112 and 114 may be fabricated by mixing the active material, a conductive material, and a binder to prepare an active material composition and coating the composition on a current collector.

Electrode manufacturing methods are well known to those of ordinary skill in the art, and thus, they are not described in detail in the present specification. The solvent may include N-methylpyrrolidone or the like, however, it is not limited thereto.

The electrolyte includes a non-aqueous organic solvent and a lithium salt.

The non-aqueous organic solvent serves as a medium for transmitting ions taking part in the electrochemical reaction of a battery. The non-aqueous organic solvent may be one or more of a carbonate-based solvent, an ester-based solvent, an ether-based solvent, a ketone-based solvent, an alcohol-based solvent, or an aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and/or the like.

When the linear carbonate compounds and cyclic carbonate compounds are mixed, an organic solvent having high dielectric constant and low viscosity can be provided. The cyclic carbonate and the linear carbonate may be mixed together in a volume ratio ranging from about 1:1 to about 1:9.

Examples of the ester-based solvent may include n-methylacetate, n-ethylacetate, n-propylacetate, dimethylacetate, methylpropionate, ethylpropionate, γ-butyrolactone, decanolide, valerolactone, mevalonolactone, caprolactone, and/or the like. Examples of the ether-based solvent include dibutyl ether, tetraglyme, diglyme, dimethoxyethane, 2-methyltetrahydrofuran, tetrahydrofuran, and/or the like. Examples of the ketone-based solvent include cyclohexanone and/or the like. Examples of the alcohol-based solvent include ethyl alcohol, isopropyl alcohol, and/or the like.

The non-aqueous organic solvent may be used singularly or in a mixture. When the organic solvent is used in a mixture, the mixture ratio can be controlled in accordance with a desired battery performance.

The non-aqueous electrolyte may further include an overcharge inhibitor additive such as ethylenecarbonate, pyrocarbonate, and/or the like.

The lithium salt is dissolved in the organic solvent. The lithium salt supplies lithium ions in the battery and improves lithium ion transportation between positive and negative electrodes therein.

The lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (where x and y are natural numbers), LiCl, Lil, $LiB(C_2O_4)_2$ (lithium bis(oxalato) borate, LiBOB), or a combination thereof, as a supporting electrolytic salt.

The lithium salt may be used in a concentration ranging from about 0.1 M to about 2.0 M. In some embodiments, when the lithium salt is included within the above concentration range, an electrolyte has good performance and good lithium ion mobility due to optimal electrolyte conductivity and viscosity.

The separator 113 may include any materials commonly used in the conventional lithium battery as long as it separates a negative electrode 112 from a positive electrode 114 and transports lithium ions. In other words, the separator 113 may have a low resistance to ion transportation and a high electrolyte impregnation. For example, the separator may be selected from glass fiber, polyester, TEFLON (tetrafluoroethylene), polyethylene, polypropylene, polytetrafluoroethylene (PTFE), or a combination thereof. It may have a form of a non-woven fabric or a woven fabric. For example, a polyolefin-based polymer separator such as polyethylene, polypropylene, or the like is commonly used for a lithium ion battery. In order to provide heat resistance and/or mechanical strength, a coated separator including a ceramic component or a polymer material may be used. The separator may have a single-layered structure or multi-layered structure.

The following examples illustrate the present invention in more detail. These examples, however, should not in any sense be interpreted as being intended to limit the scope of the present invention.

Those of ordinary skill in this art should be able to understand portions of the present disclosure that are not described in detail.

Preparation of Positive Active Material

Example 1

2.4 M aqueous solutions of $NiSO_4$, $CoSO_4$, and $MnSO_4$ were mixed in a mole ratio of 4:3:3. A 7.5 M aqueous solution of NaOH and a 15 M aqueous solution of $NH_4OH$ were added thereto. The mixture was continuously mixed using a co-precipitator. The resulting mixture was co-precipitated at 40° C. at a reaction speed of about 700 rpm, and at a pH of 11 for 8 hours, obtaining a $(Ni_{0.4}Co_{0.3}Mn_{0.3})(OH)_2$ precursor.

The precursor was washed with water, dried in a 120° C. oven, and filtered. The obtained precursor was mixed with $Li_2CO_3$ in a weight ratio of about 1:1.3 using a mixer. The resulting mixture was raised to a temperature of 890° C. at a speed of 2° C./min and then fired at 890° C. for about 10 hours, preparing an over lithiated oxide, $0.3Li_2MnO_3 \cdot 0.7LiNi_{0.58}Co_{0.418}Mn_{0.002}O_2$ (lithium metal oxide, $Li_{1.3}Ni_{0.44}Co_{0.28}Mn_{0.28}O_2$).

The over lithiated, 2.4 M aqueous solutions of $NiSO_4$, $CoSO_4$, and $MnSO_4$ were mixed in a mole ratio of 6:2:2. A 7.5 M aqueous solution of NaOH and a 15 M aqueous solution of $NH_4OH$ were added thereto. The mixture was continuously mixed using a co-precipitator. The resulting mixture was co-precipitated at a pH of 11, 40° C., and a reaction speed of about 700 rpm for 8 hours, obtaining a $(Ni_{0.44}Co_{0.28}Mn_{0.28})(OH)_2$ precursor on a surface of the over lithiated oxide.

The resultant was washed with water, dried in a 120° C. oven, and filtered. The obtained precursor was mixed with $Li_2CO_3$ in a weight ratio of about 1:1.08 using a mixer. The resulting mixture was raised to a temperature of 890° C. at a speed of 2° C./min and fired at 890° C. for about 10 hours, obtaining a lithium metal oxide, $Li_{1.3}Ni_{0.44}Co_{0.28}Mn_{0.28}O_2$.

Comparative Example 1

2.4 M aqueous solutions of $NiSO_4$, $CoSO_4$, and $MnSO_4$ were mixed in a mole ratio of 4:3:3. A 7.5 M aqueous solution of NaOH and a 15 M aqueous solution of $NH_4OH$ were added thereto. The mixture was continuously mixed using a co-precipitator. The resulting mixture was co-precipitated at a pH of 11, 40° C., and a reaction speed of about 700 rpm for 8 hours, obtaining a $(Ni_{0.4}Co_{0.3}Mn_{0.3})(OH)_2$ precursor.

The precursor was washed with water, dried in a 120° C. oven, and filtered. The filtered precursor was mixed with $Li_2CO_3$ in a weight ratio of about 1:1.3 using a mixer. The mixture was raised to a temperature of 890° C. at a speed of 2° C./min and then fired at 890° C. for about 10 hours, obtaining over lithiated oxide, $0.3Li_2MnO_3 \cdot 0.7LiNi_{0.58}Co_{0.418}Mn_{0.002}O_2$ (lithium metal oxide, $Li_{1.3}Ni_{0.4}Co_{0.3}Mn_{0.3}O_2$).

EVALUATION 1

Scanning Electronic Microscope (SEM) Photograph of Positive Active Material

Scanning electron microscope (SEM) photographs were taken of the positive active materials according to Example 1 and Comparative Example 1. The results are provided in FIGS. 3 and 4.

Figure 3:
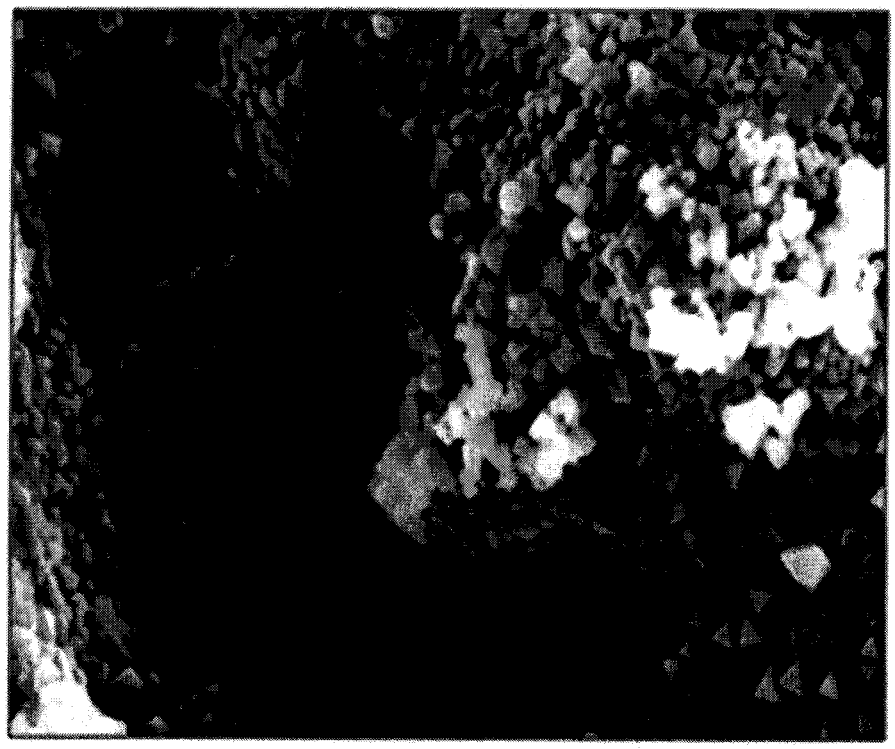
FIGS. 3 and 4 are scanning electronic microscope (SEM) photographs of a positive active material according to Example 1 and Comparative Example 1, respectively.
Figure 4:
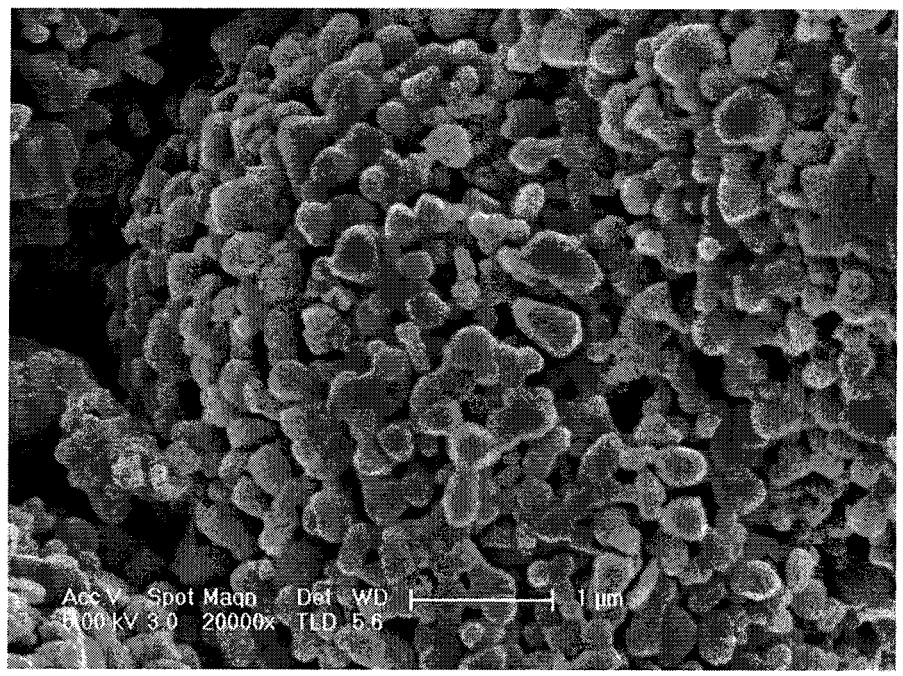

FIGS. 3 and 4 are scanning electronic microscope (SEM) photographs of the positive active materials according to Example 1 and Comparative Example 1. In FIG. 3, the white portions indicated the uncontinuous (non-continuous) portions of the lithium nickel cobalt manganese oxide. Referring to FIGS. 3 and 4, the positive active material according to Example 1 has a structure where the surface of the over lithiated oxide is coated in an island shape, i.e., it includes non-continuous portions on its surface, while the positive active material according to Comparative Example 1 has a non-coated structure.

EVALUATION 2

Energy Dispersive X-Ray Spectrometer (EDX) Measurement of Positive Active Material An elemental analysis of the positive active material according to Example 1 was performed using an energy dispersive X-ray spectrometer (EDX). The result is provided in FIGS. 5 and 6.

Figure 5:
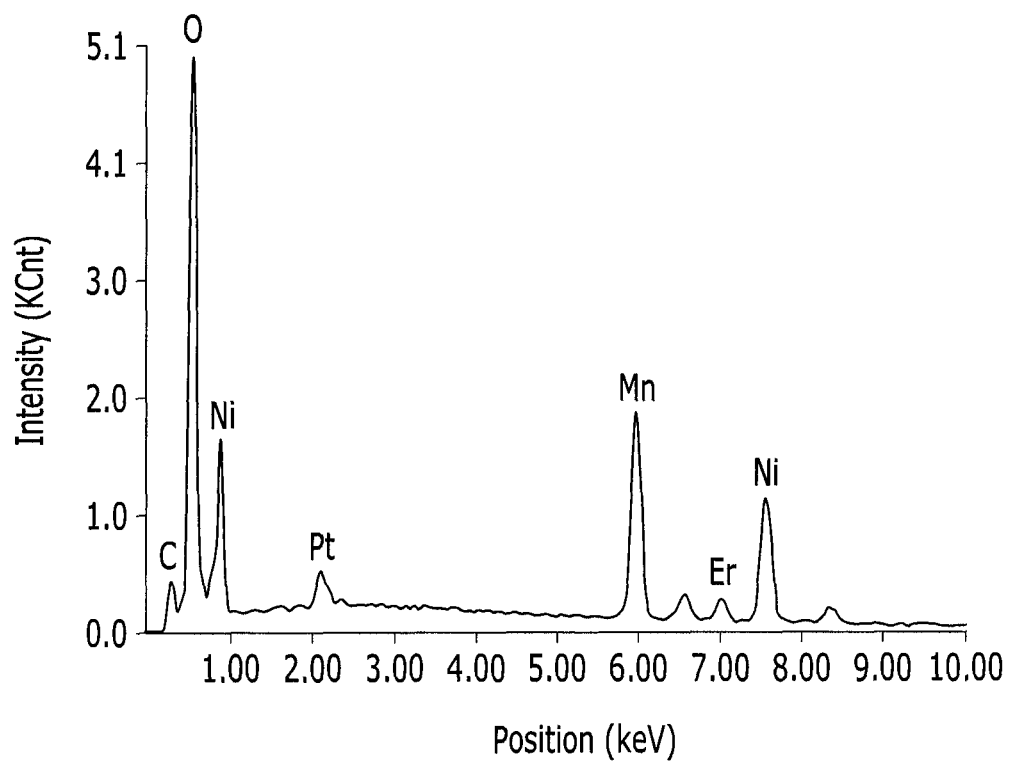
FIG. 5 is an energy dispersive X-ray (EDX) graph showing the inside of the positive active material according to Example 1.
Figure 6:
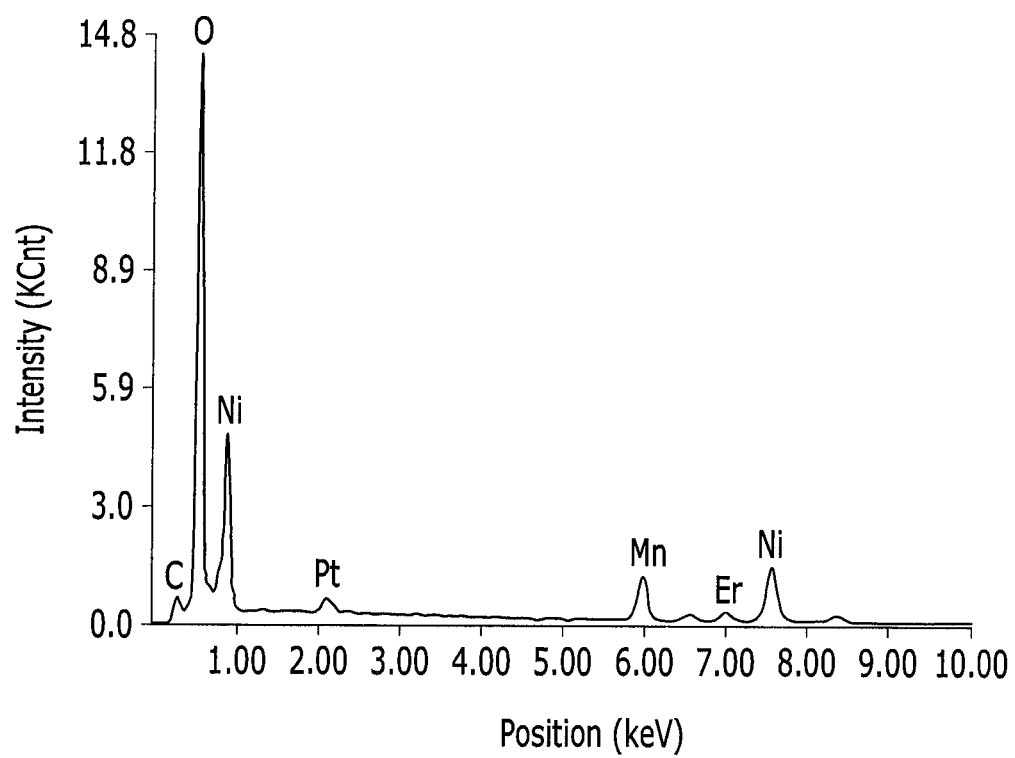
FIG. 6 is an energy dispersive X-ray (EDX) graph showing the surface of the positive active material according to Example 1.

FIG. 5 is an energy dispersive X-ray spectrometer (EDX) graph of the inside (i.e., the interior over-litihiated portion) of the positive active material according to Example 1, and FIG. 6 is an energy dispersive X-ray spectrometer (EDX) graph showing the surface (i.e., the active material on an outer surface of the over-lithiated portion) of the positive active material according to Example 1.

Based on the EDX graphs of FIGS. 5 and 6, the atomic amount on the surface and the inside of the positive active material was analyzed, and the result is provided in the following Table 1.

TABLE 1

|  | Inside positive active material | Surface of positive active material |
| --- | --- | --- |
| Ni (atom %) | 50 | 63 |
| Co (atom %) | 20 | 20 |
| Mn (atom %) | 30 | 17 |

Referring to Table 1, the positive active material according to Example 1 included Ni:Mn in an atomic weight ratio of between 1:1 to 2:1 inside thereof and in an atomic weight ratio of between 3:1 to 4:1 on the surface. Accordingly, the positive active material was coated with a lithium nickel cobalt manganese oxide that included a relatively large amount of Ni and thus, had improved electrical conductivity on the surface.

EVALUATION 3

Electrical Conductivity Measurement of Positive Active Material

The positive active materials according to Example 1 and Comparative Example 1 were measured regarding electrical conductivity, and the result is provided in the following Table 2.

The electrical conductivity was measured using a 4 probe chip by applying a pressure of 20 kN to a positive active material and forming it into a pellet.

TABLE 2

|  | Example 1 | Comparative Example 1 |
| --- | --- | --- |
| Electrical conductivity (S/cm) | $5.3 \times 10^{-2}$ | $7.06 \times 10^{-3}$ |

Referring to Table 2, the positive active material according to Example 1 including non-continuous portions of lithium nickel cobalt manganese oxide (i.e., island shapes) coated on the surface of the over lithiated oxide had higher electrical conductivity than the positive active material having a non-coated structure according to Comparative Example 1.

EVALUATION 4

XRD Measurement of Positive Active Material

The positive active material according to Example 1 was measured using an X-ray diffraction analysis (XRD). The result is provided in the following FIG. 7.

Figure 7:
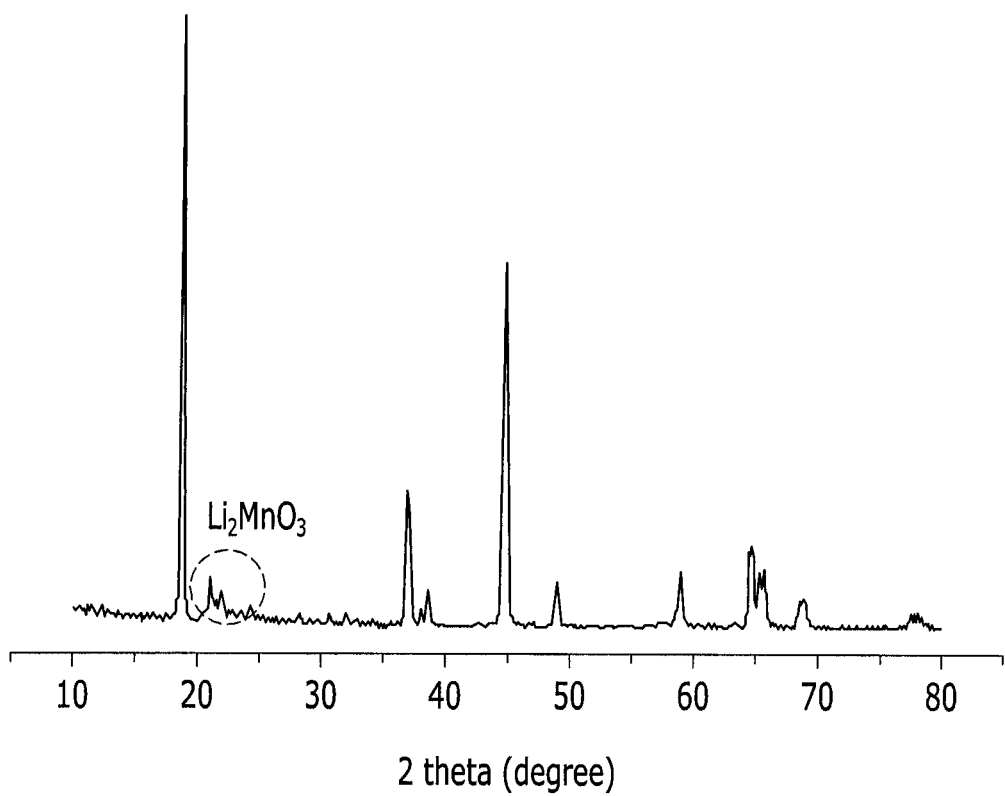
FIG. 7 is an X-ray diffraction analysis (XRD) graph showing the positive active material according to Example 1.

FIG. 7 is an X-ray diffraction analysis (XRD) graph showing the positive active material according to Example 1. Referring to FIG. 7, the graph had a main $Li_2MnO_3$ peak around about 22° C.

Fabrication of Rechargeable Lithium Battery Cells 96 wt % of each positive active material according to Example 1 and Comparative Example 1, 2 wt % of polyvinylidene fluoride (PVdF), and 2 wt % of acetylene black were mixed, and the mixtures were dispersed in N-methyl-2-pyrrolidone, preparing slurries. The slurries were respectively coated on 60 μm-thick aluminum foil, dried at 135° C. for at least about 3 hours, and compressed, fabricating positive electrodes with a positive active material layer.

The positive electrode and a lithium metal counter electrode were used to fabricate a coin-type half-cell. Herein, an electrolyte solution was prepared by mixing ethylenecarbonate (EC) and dimethylcarbonate (DMC) in a volume ratio of 3:7 and dissolving $LiPF_6$ therein at a concentration of 1.3 M.

EVALUATION 5

Charge and Discharge Characteristic of Rechargeable Lithium Battery Cell

Each half-cell fabricated using each positive active material according to Example 1 and Comparative Example 1 was evaluated regarding charge and discharge characteristics. The results are provided in FIGS. 8 and 9.

The half-cells were charged and discharged at a charge rate of 0.1 C during the first cycle. Herein, the charge had a cut-off voltage of 4.7 V, and the discharge had a cut-off voltage of 2.0 V. Starting with the second cycle, the half-cells were charged and discharged with a charge rate of 0.2 C, 0.5 C, 1 C, and 2 C. Herein, the charge had a cut-off voltage of 4.6 V, and the discharge had a cut-off voltage of 2.0 V.

Figure 8:
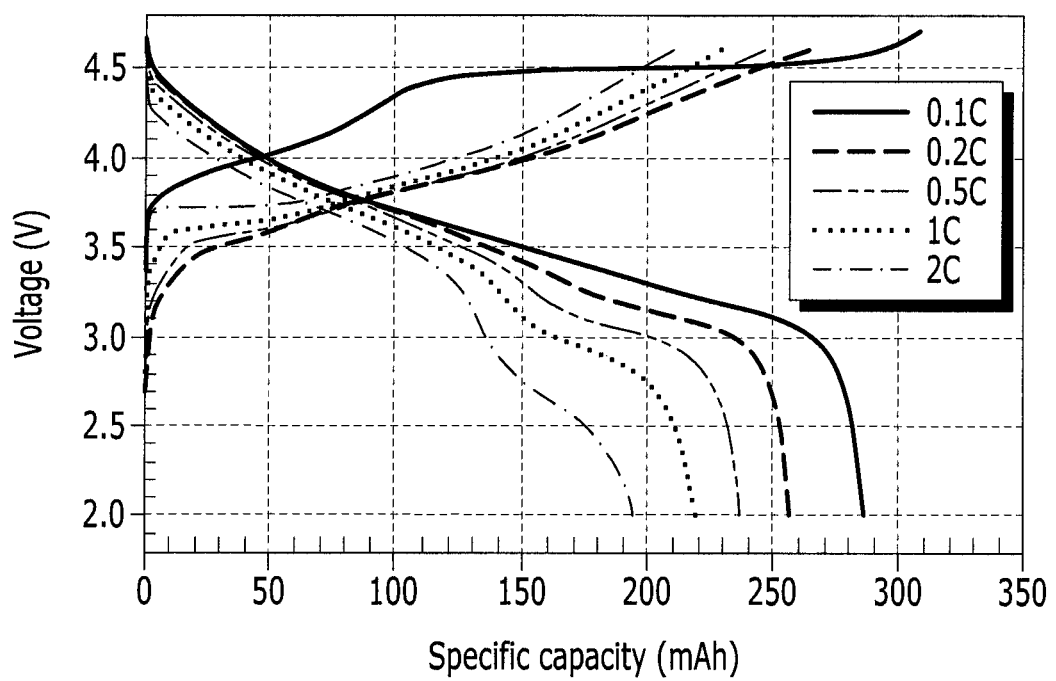
FIGS. 8 and 9 are charge and discharge graphs of half-cells including a positive active material according to Example 1 and Comparative Example 1, respectively.
Figure 9:
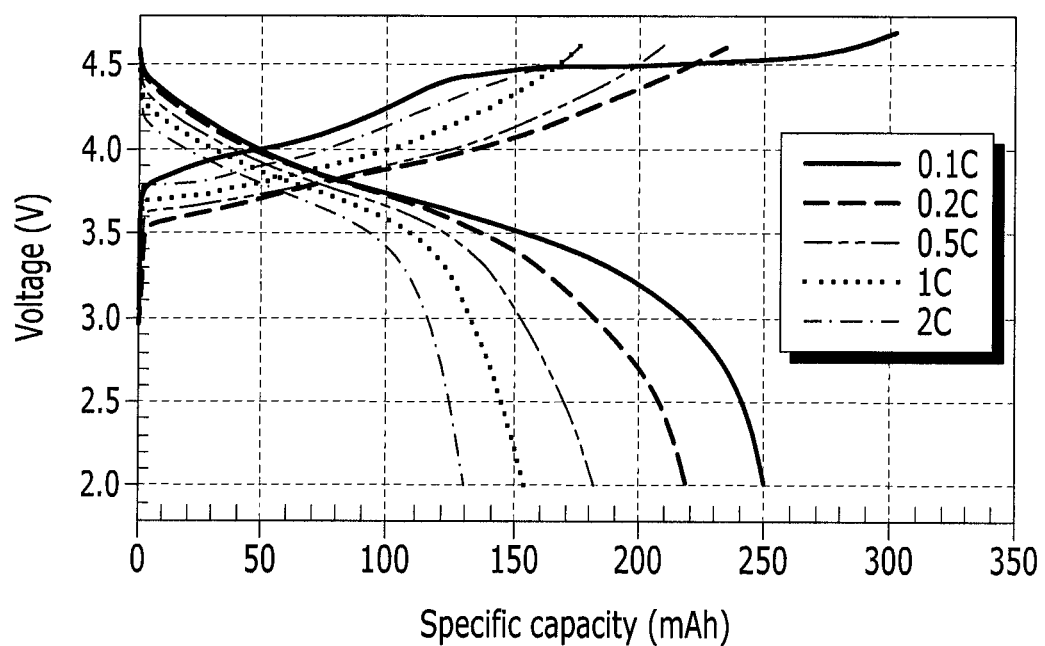

FIGS. 8 and 9 are charge and discharge graphs of the half-cells including each positive active material according to Example 1 and Comparative Example 1.

Referring to FIGS. 8 and 9, the half-cell using the positive active material including non-continuous portions of lithium nickel cobalt manganese oxide on the surface of the over lithiated oxide according to Example 1 had good high rate charge and discharge characteristics compared with the cell using the positive active material according to Comparative Example 1.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A positive active material for a rechargeable lithium battery, comprising a nickel-based composite oxide represented by the following Chemical Formula 1,
   wherein the nickel-based composite oxide comprises an over lithiated oxide and non-continuous portions of a lithium nickel cobalt manganese oxide on a surface of the over lithiated oxide,
   wherein an atomic weight ratio of Ni:Mn of the over lithiated oxide is in a range of about 1:1 to about 2:1,
   wherein an atomic weight ratio of Ni:Mn of the lithium nickel cobalt manganese oxide is in a range of about 3:1 to about 4:1:

$Li_aNi_bCo_cMn_dO_2$  Chemical Formula 1 wherein, $1<a<1.6$, $0.1<b<0.7$, $0.1<c<0.4$, and $0.1<d<0.7$, and
   wherein the manganese and nickel components of the nickel-based composite oxide have a structural concentration gradient such that the nickel-based composite oxide has a higher concentration of nickel at a surface than at an interior.

2. The positive active material for a rechargeable lithium battery of claim 1, wherein the over lithiated oxide comprises a compound represented by the following Chemical Formula 2:

$xLi_2MnO_3 \cdot (1-x)LiNi_eCo_fMn_gO_2$  Chemical Formula 2 wherein, $0<x<1$, $0<e<1$, $0<f<1$, $0<g<1$, and $e+f+g=1$.

3. The positive active material for a rechargeable lithium battery of claim 1, wherein the over lithiated oxide is included in an amount of about 5 wt % to about 60 wt % based on the total weight of the nickel-based composite oxide.

4. The positive active material for a rechargeable lithium battery of claim 1, wherein the over lithiated oxide is included in an amount of about 15 wt % to about 50 wt % based on the total weight of the nickel-based composite oxide.

5. The positive active material for a rechargeable lithium battery of claim 1, wherein the lithium nickel cobalt manganese oxide comprises a compound represented by the following Chemical Formula 3:

$Li_iNi_jCo_kMn_lO_2$  Chemical Formula 3 wherein, $0.95<i<1.05$, $0.4\leq j\leq 0.8$, $0.1\leq k\leq 0.3$, and $0.1\leq l\leq 0.3$.

6. The positive active material for a rechargeable lithium battery of claim 1, wherein the lithium nickel cobalt manganese oxide is included in an amount of about 40 wt % to about 95 wt % based on the total weight of the nickel-based composite oxide.

7. The positive active material for a rechargeable lithium battery of claim 1, wherein the lithium nickel cobalt manganese oxide is included in an amount of about 50 wt % to about 85 wt % based on the total weight of the nickel-based composite oxide.

8. The positive active material for a rechargeable lithium battery of claim 1, wherein an atomic weight ratio of Ni:Mn of the over lithiated oxide is in a range of about 1:1 to about 1.7:1.

9. The positive active material for a rechargeable lithium battery of claim 1, wherein an atomic weight ratio of Ni:Mn of the lithium nickel cobalt manganese oxide is in a range of about 3:1 to about 3.5:1.

10. A rechargeable lithium battery, comprising
    a positive electrode comprising the positive active material according to claim 1;
    a negative electrode; and
    an electrolyte.

* * * * *